(12) United States Patent
Dumas et al.

(10) Patent No.: US 12,433,509 B2
(45) Date of Patent: Oct. 7, 2025

(54) ELONGATION SENSOR AND WEARABLE ARTICLE INCLUDING THE ELONGATION SENSOR

(71) Applicant: CHRONOLIFE, Paris (FR)

(72) Inventors: Pascal Dumas, Versailles (FR); Guillaume Chenegros, Bassou (FR); Stéphane Carras, Condé-sur-Noireau (FR)

(73) Assignee: CHRONOLIFE, Paris (FR)

( * ) Notice: Subject to any disclaimer, the term of this patent is extended or adjusted under 35 U.S.C. 154(b) by 521 days.

(21) Appl. No.: 17/641,204

(22) PCT Filed: Sep. 8, 2020

(86) PCT No.: PCT/EP2020/075115
§ 371 (c)(1),
(2) Date: Mar. 8, 2022

(87) PCT Pub. No.: WO2021/048149
PCT Pub. Date: Mar. 18, 2021

(65) Prior Publication Data
US 2024/0049992 A1     Feb. 15, 2024

(30) Foreign Application Priority Data
Sep. 9, 2019   (EP) ..................... 19306081

(51) Int. Cl.
*A61B 5/113* (2006.01)
*A61B 5/00* (2006.01)
*A61B 5/08* (2006.01)

(52) U.S. Cl.
CPC .......... *A61B 5/1135* (2013.01); *A61B 5/0806* (2013.01); *A61B 5/6805* (2013.01); *A61B 2562/0261* (2013.01)

(58) Field of Classification Search
CPC ... A61B 5/1135; A61B 5/0806; A61B 5/6805; A61B 2562/0261
See application file for complete search history.

(56) References Cited

U.S. PATENT DOCUMENTS

| | | | |
|---|---|---|---|
| 5,015,958 A | * | 5/1991 | Masia ..................... G01M 3/18 174/11 R |
| 2005/0034485 A1 | | 2/2005 | Tam-Telesante |

(Continued)

FOREIGN PATENT DOCUMENTS

| | | |
|---|---|---|
| CN | 106894133 A | 6/2017 |
| EP | 1506738 B1 | 5/2009 |

(Continued)

OTHER PUBLICATIONS

International Search Report and Written Opinion issued on Oct. 14, 2020 in corresponding International Patent Application No. PCT/EP2020/075115; 9 pages.

(Continued)

*Primary Examiner* — Eric F Winakur
(74) *Attorney, Agent, or Firm* — Maier & Maier, PLLC

(57) ABSTRACT

An elongation sensor, which includes an elastic, electrically insulating core, and at least two resistive elements arranged helically around the elastic core in opposite directions and in contact with each other. A wearable article including a flexible support, at least one elongation sensor arranged on the flexible support so as to have a length varying when a wearer of the wearable article breathes or when muscles of the wearer are contracted or relaxed, and at least one flexible strip arranged on the flexible support. Also, detecting breathing of a subject with the wearable article.

13 Claims, 3 Drawing Sheets

(56) References Cited

U.S. PATENT DOCUMENTS

| | | |
|---|---|---|
| 2007/0171024 A1 | 7/2007 | Yang |
| 2008/0228097 A1 | 9/2008 | Tang |
| 2010/0105992 A1 | 4/2010 | Oda et al. |
| 2018/0042551 A1 | 2/2018 | Gouthez et al. |

FOREIGN PATENT DOCUMENTS

| | | |
|---|---|---|
| EP | 3502327 A1 | 6/2019 |
| FR | 3033233 B1 | 9/2016 |
| JP | 2010099327 A | 5/2010 |
| JP | 2017512542 A | 5/2017 |
| JP | 2017123911 A | 7/2017 |
| JP | 2017125291 A | 7/2017 |
| JP | 2018507081 A | 3/2018 |
| WO | 2014122619 A1 | 8/2014 |
| WO | 2017035654 A1 | 3/2017 |
| WO | 2018037855 A1 | 3/2018 |
| WO | 2019098182 A1 | 5/2019 |
| WO | 2019143694 A1 | 7/2019 |

OTHER PUBLICATIONS

Office Action issued on Jun. 27, 2023, in corresponding Japanese Application No. 2022-515616, 7 pages.

\* cited by examiner

ELONGATION SENSOR AND WEARABLE ARTICLE INCLUDING THE ELONGATION SENSOR

FIELD

The present disclosure generally relates to the field of elongation measurement technology and, in particular, relates to an elongation sensor and to an elongation sensor embedded in wearable article and usable to monitor body conditions such as breathing or muscle activities (i.e. contractions and relaxations).

BACKGROUND

Electronic devices for detecting and processing biometric signals of a user have been developed that allow medical supervision of people during their usual activities or situations. Sensors may be applied to the skin or specific body area, for example chest, of a user so as to perform temperature measurement, to determine physiological parameters or to detect electrical signals related for example to a cardiac function. Monitoring the various signals delivered by these sensors allows determining user specific physiological condition that might be impaired. For example, when an individual is having a seizure, specific signal features appear on the signals corresponding to the electrocardiogram (ECG) or to respiration.

A convenient possibility to permanently monitor respiratory activity is to integrate a breathing sensor into a garment or some other wearable article. Such a breathing sensor acquires information about parameters such as frequency and amplitude of breathing of a user and transmits it to external medical equipment, such as a monitoring, diagnostic, or stimulating devices.

However, conventional breathing sensors can lack sensitivity and can be cumbersome thus causing a lack of comfort for the user. Furthermore, they can be fragile and their assembly in the garment and their electric connection can be complex.

Similarly, it might be desirable to have sensors able to measure muscle activities, e.g. muscle spasms, in order for example to monitor muscle jerking or twitching in case of seizure, epilepsy or convulsion (e.g. myoclonic seizure or myoclonic epilepsy).

Examples of garments incorporating breathing sensors are disclosed in the prior art. For example, US 2007/0171024 discloses the use of conductive yarn consisting in metal yarns twisted with textile fibres or textile fibres mixed with metal fibres. However its use requires specific knitting process in order to incorporate it in the wearable device and stripping step in order to connect the conductive yarn to the measurement device. Similarly US 2018/0042551 discloses a knitted breathing sensor.

Accordingly, a need exists for an elongation sensor that solves the above-mentioned problems.

SUMMARY

The present invention provides a wearable article, comprising:
- a flexible support;
- at least one elongation sensor, arranged on the flexible support so as to have a length varying when a wearer of the wearable article breathes or when muscles of the wearer are contracted or relaxed; and
- at least one flexible strip arranged on the flexible support, wherein the elongation sensor comprises:
- an elastic, electrically insulating core; and
- at least two resistive elements arranged helically around the elastic core, wherein two of the resistive elements are helically arranged in opposite directions and in contact with each other, wherein the at least one flexible strip forms a sheath and wherein the elongation sensor is disposed in the sheath.

In one embodiment the core is made of an elastane material.

Using elastane material is advantageous since it is a flexible, elastic and non-conductive material that can be easily manipulated.

Alternatively the core is made of yarn coated with silicone rubber.

The two helically arranged resistive elements form a plurality of overlapping regions which create multiple contacts, more particularly electrical contacts, between the two resistive elements. When the elongation sensor is stretched, the two helically arranged resistive elements slide along each other and the distance between adjacent overlapping regions increases, thus modifying electrical contacts. This, in turn, changes the resistance value of the elongation sensor. The modification of the electrical contacts during the stretching and retraction of the elongation sensor generates a modification of the resistance which can be measured to provide information such as breathing amplitude and/or breathing frequency, or alternatively such as muscle contraction/relaxation amplitude and/or muscle contraction/relaxation frequency, of a user of the elongation sensor.

In one embodiment, at least one of the resistive elements comprises metal-plated material.

In one preferred embodiment, each of the resistive elements comprises metal-plated material.

In one embodiment, said material is natural yarn (e.g. cotton or silk) or synthetic yarn.

In one embodiment, at least one of the resistive elements comprises metal-plated polyamide-based material.

In one preferred embodiment, each of the resistive elements comprises metal-plated polyamide-based material.

Polyamide-based material confers flexible properties to the resistive elements.

In one embodiment, each of the resistive elements comprises two yarns of metal-plated polyamide-based material.

According to a special embodiment, said metal is selected in the group of silver and gold.

According to preferred embodiment, each of the resistive elements comprises silver-plated polyamide-based material, and more particularly comprises two yarns of silver-plated polyamide-based material.

In one embodiment, each resistive element has a resistance smaller than about 200 Ω/m, preferably between about 150 and about 180 Ω/m, even more preferably of about 172 Ω/m.

The term "about" as used herein means within 20%, preferably within 10%, and more preferably within 5%. In specific case, "about X", means "X".

In one embodiment, the resistive elements are arranged helically around the core with a pitch in a range from 0.9 mm to 1.8 mm.

The distance between two adjacent turns of each resistive element is chosen to be larger than the diameter of each resistive element in order to avoid interaction between adjacent turns and to avoid piling up of resistive elements. In addition, the distance between two adjacent turns of each resistive element is chosen to not be too large since otherwise the relative change in resistance would be small during elongation of the resistive elements. Periodicity values in a range from 0.9 mm to 1.8 mm turned out to well fulfill both constraints. This corresponds to torsion values in a range from 570 T/m to 1120 T/m (T/m stands for turns per meter).

The resistance of the elongation sensor depends on several parameters, such as the material used to fabricate the resistive elements as well as the diameter of the helically arranged resistive elements, their winding periodicity and their length.

According to specific embodiment, the resistance of the elongation sensor is in a range from about 200 to about 250 Ω/m.

In one aspect of the invention, the elongation sensor is used for detecting breathing of a subject.

In one aspect of the invention, the elongation sensor is used for detecting muscle activities (contraction/relaxation), e.g. muscle spasms, of a subject.

An elongation sensor which encompasses parts of a body that expand and contract during breathing will be stretched during inhalation and retracted during exhalation. Similarly, elongation sensor which encompasses parts of a body that expand and contract during muscle contraction, e.g. muscle spasm, will be stretched during contraction phase and retracted during relaxation phase. Stretching and retraction is measured by the elongation sensor and is used as a basis to calculate different parameters such as breathing or muscle contraction/relaxation amplitude and/or frequency.

According to another aspect, the present invention provides a wearable article, e.g. clothing item, preferably a t-shirt, comprising:
 a flexible support;
 at least one elongation sensor of the Invention, arranged on the flexible support so as to have a length varying when a wearer of the wearable article breathes or when contraction/relaxation of muscle occurs.

The flexible support is made of electrically insulating material such as non-conductive fabric (e.g. cotton/elastane or polyamide/elastane). According to special embodiment, the elongation sensor is fixed to the side of the wearable article that faces the skin of the wearer.

The elongation sensors are arranged on the flexible support by attachment.

In one embodiment each of the two resistive elements of the at least one elongation sensor has two ends attached to the flexible support.

The elongation sensor(s) will stretch and retract during breathing or muscle contraction/relaxation of a wearer of the wearable article since the ends of the elongation sensor cannot freely move with respect to the flexible support.

In one embodiment, the ends of the resistive elements are attached to the flexible support by stitching.

In order to tightly attach the resistive elements to the flexible support, both ends of each resistive element are attached, e.g. by stitching, along a defined length to the flexible support.

In one embodiment, the wearable article further comprises conductive yarns connected to the ends of the resistive elements, preferably said connection is made by the stitching.

For electrically connecting the elongation sensor to other electronic devices such as an electronic board in the wearable article, conductive yarns are stitched to the ends of the elongation sensor.

In one embodiment, the conductive yarns are sewn on the flexible support.

The conductive yarn is flexible and robust, which makes it adapted for sewing it to the flexible support of the wearable article to connect electronic devices and the elongation sensor.

In one embodiment, the wearable article further comprises one or more flexible strips forming a flexible sheath disposed on the flexible support, wherein the elongation sensor is disposed in the flexible sheath and wherein the elongation sensor can freely stretch and retract.

In order to reduce the friction of the elongation sensor with the surrounding flexible support and/or the skin of the wearer of the wearable article and in order to increase the longevity of the elongation sensor, it is placed in a flexible sheath. The elongation sensor can freely glide within the sheath. When the flexible sheath is worn skin-tightly or even slightly stressed, the elongation sensor glides skin-tightly within the flexible sheath.

In one embodiment, the elongation sensor is configured to be pre-stressed when the wearable article is worn by the wearer. The elongation sensor is thus slightly under tension which allows for the elongation sensor to detect even small elongations, e.g. small respiratory movements or small muscle spasms.

In another embodiment, the wearable article is in the form of a garment, and the at least one elongation sensor is disposed to be located around a chest of the wearer.

An elongation sensor may also, alternatively or as a complement, be disposed to be located around an abdomen of the wearer.

In another embodiment, the wearable article is in the form of any wearable article (e.g. strapping, clothing), and the at least one elongation sensor is disposed to be located around a muscle of the wearer.

BRIEF DESCRIPTION OF THE DRAWINGS

The accompanying drawings, which are incorporated herein and form a part of the specification, illustrate the present invention and, together with the description, further serve to explain the features of the invention and to enable a person skilled in the pertinent art to make and use the invention. In the drawings, like reference characters indicate identical or functionally similar elements.

DETAILED DESCRIPTION

Figure 1:
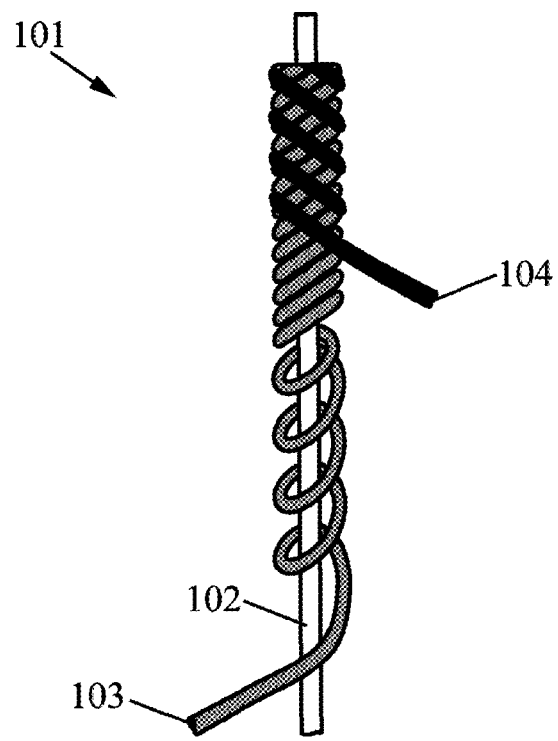
FIG. 1 is a schematic representation of an elongation sensor.

FIG. 1 shows a schematic representation of an elongation sensor 101. It comprises an elastic, non-conductive core 102, which can be made of an elastane material such as Lycra™ for example. Furthermore, the elongation sensor comprises two resistive elements 103, 104 that are helically wound around the core.

In one embodiment, each of the resistive elements 103, 104 comprises metal-plated polyamide-based material.

In one embodiment, each of the resistive elements 103, 104 comprises two threads of metal-plated polyamide-based material.

According to special embodiment said metal is selected in the group of silver and gold.

According to preferred embodiment, each of the resistive elements 103, 104 comprises silver-plated polyamide-based material.

Resistive elements 103, 104 can be prepared using silver-plated threads provided by Noble Biomaterials under the trade name Circuitex. A Circuitex thread has a flexible inner part made of polyamide and is plated with silver.

According to a preferred embodiment the resistive elements 103, 104 have a resistance of 172 Ω/m.

Both helically arranged resistive elements may have the same pitch, but the invention is not limited thereto. The pitch of the helically wound resistive element lies in a range from 0.9 mm to 1.8 mm which corresponds to torsion values in a range from 570 T/m to 1120 T/m (T/m stands for turns per meter). The resistance of the elongation sensor lies in a range from 200 to 250 Ω/m.

Figure 2:
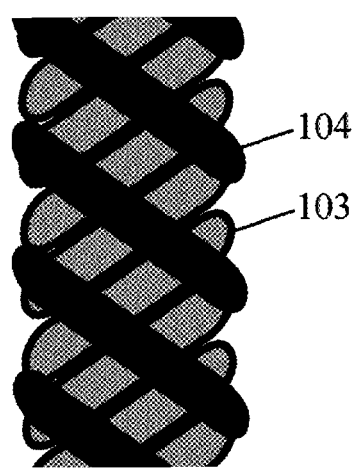
FIGS. 2-3 show a zoom on the windings of two identical elongation sensors that experience small and large elongation forces, respectively.
Figure 3:
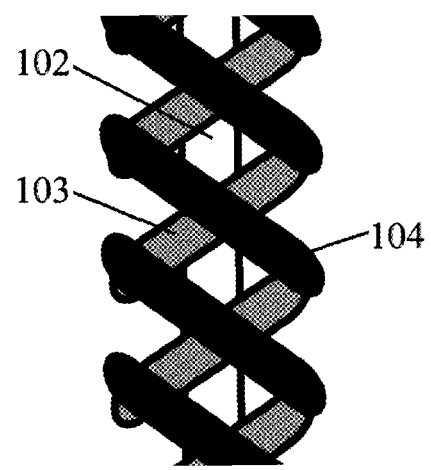

FIGS. 2-3 show a zoom on the windings of two identical elongation sensors 101 that experience two different elongation forces. The two helically arranged resistive elements 103, 104 form a plurality of overlapping regions which create multiple electrical contacts between the resistive elements. When the elongation sensor is stretched, the two helically arranged resistive elements slide along each other and the distance between adjacent overlapping regions increases. This, in turn, changes the resistance of the elongation sensor. FIG. 3 shows an elongation sensor that experiences a higher elongation force than the elongation sensor shown in FIG. 2. Hence, in FIG. 3, the distance between adjacent overlapping regions increases with respect to the case shown in FIG. 2. It is mainly the modification of these electrical contacts during the stretching and retraction of the elongation sensor which generates a modification of the resistance.

By way of example, the resistance of the elongation sensor in its rest position may lie in a range from 200 to 250 Ω/m. The resistance of the elongation sensor may vary between 5% and 20% for an elongation of 5 cm.

Figure 5:
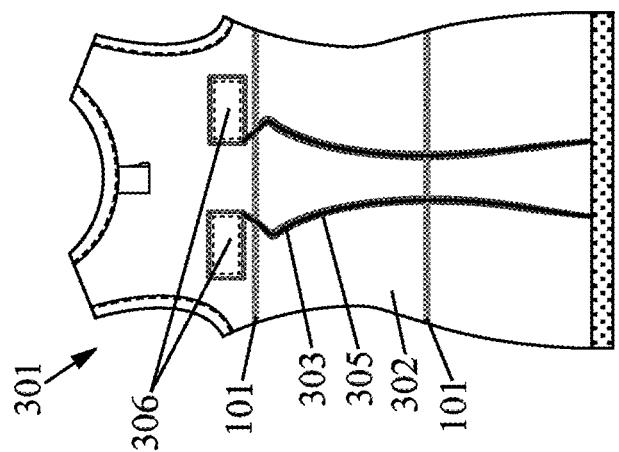
FIGS. 4-5 are schematic views of the front side and the back side of a garment that includes physiological sensors.
Figure 4:
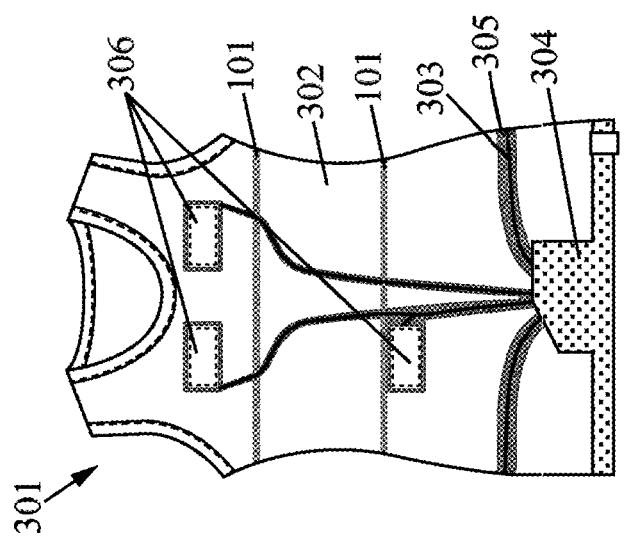

FIGS. 4-5 are views of the front side (FIG. 4) and the back side (FIG. 5) of a garment 301, which is a T-Shirt in the present embodiment. The T-Shirt comprises several sensors 306 configured to detect physiological parameters. The T-Shirt has a flexible support 302 made of non-conductive fabric, like cotton/elastane or polyamide/elastane for example. According to special embodiment, the flexible support contains between 6% and 12% of elastane such that the T-Shirt tightly fits the body of a user. This makes sure that the sensors included in the T-Shirt are in close contact with the skin of a wearer.

A plurality of sensors are integrated in the flexible support, among others two elongation sensors 101 to follow the breathing of a user. These two elongation sensors surround the T-Shirt at the height of the chest and the abdomen of a wearer, respectively.

In the present case, the positions of the elongation sensors in the T-Shirt are chosen to evaluate the thoracic and abdominal respiration, however other localisations are possible especially when muscle contractions are monitored. The elongation sensors surround at least a significant part of the chest and/or the abdomen of the wearer in order to obtain precise information about the breathing of the wearer. The length of the elongation sensors is determined such that the elongation sensors are pre-stretched when worn by the user, here by around 15%.

The measured resistance variations of the elongation sensor are processed to monitor breathing parameters, such as breathing rhythm of the user or the amplitude of the respiratory cycles. Each elongation sensor is installed in an elastic sheath that surrounds the T-Shirt at the height of the chest and/or the abdomen of a wearer. Flexible strips are arranged on the flexible support to form a tunnel in which the elongation sensor can freely glide. The flexible strips serve as protection and minimize wear of the the elongation sensor, especially during washing of the T-Shirt. Topstitches are used to secure the attachment of the flexible strips to the flexible support.

In an embodiment, the elongation sensors are connected by conductive yarn 303 to an electronic board. The conductive yarn may be built from an assembly of two Circuitex silver yarns from Noble Biomaterials. Each Circuitex resistive element has a flexible polyamide core plated with silver. The conductive yarn corresponding to the assembly of two Circuitex silver yarns has a resistance of 172 Ω/m. The assembly may further be covered by two Solvron threads to reinforce the assembly and to limit its unravelling which could increase the risks of a short circuit. Solvron is the trade name of a synthetic thread made of polyvinyl alcohol provided by NITIVY CO., LTD. The conductive yarn is flexible which allows for performing stitching or sewing operations while the silver ensures its electrical properties. Both ends of the elongation sensors are fixed to the flexible support of the T-Shirt by sewing with conductive yarns.

An electronic board 304 is installed in the T-Shirt in an integrated pocket. The electronic board comprises a battery.

All sensors and electronic components may be disposed on the inner side of the T-Shirt (side that is in contact with the skin of the user).

To avoid that different conductive yarns touch each other which may create a short circuit and bring wrong data, a possibility is to use topstitches to separate different conductive yarns from each other and to avoid any skin contact.

The conductive yarn may be covered by flexible strips 305 bonded to the flexible support 302 of the T-Shirt along the path of the conductive yarn. The flexible strips serve as protection. They minimize wear of the conductive yarn, especially during washing of the T-Shirt. Furthermore, the skin of a wearer is protected by these flexible strips from the conductive yarn. The flexible strips are made of non-conductive elastic material, like polyamide, cotton or elastane for example. Here, cotton strips are bonded to the inner side of the T-Shirt (the side that is in contact with the skin of the user) to increase the wearing comfort for the user. Synthetic strips are used on the outer side of the T-Shirt. Topstitches are used to secure the attachment of the flexible strips to the flexible support.

Physiological sensors integrated in the T-Shirt, such as the above-described elongation sensor, can acquire data continuously or when triggered. For example, the sensors can be configured to start acquisition when the rhythm or amplitude of heart beat changes. The acquired data can be transmitted to a user device such as a smartphone to analyze the data close to the wearer, or the data can be transmitted to a central processing unit where they are accessible by the user and/or by a medically qualified person.

The T-Shirt described in FIGS. 4-5 will find many applications, for example in medicine to monitor the state of a patient to detect syndroms of an illness. It will find further applications in sports, where it can be used for example by a coach to survey the health conditions of the sportsperson.

The wearer of the can be a human or an animal, such as a dog for example.

Figure 6:
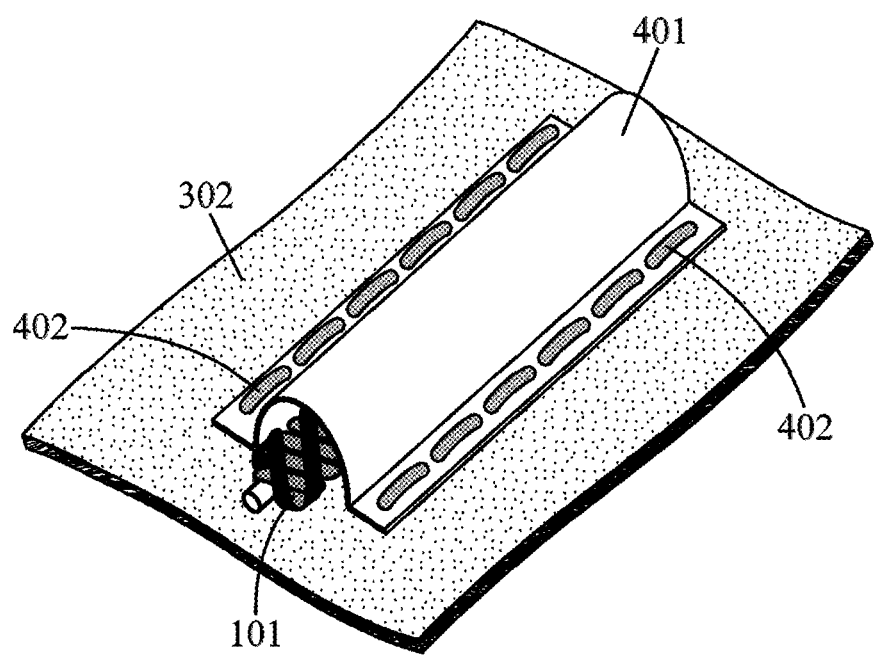
FIG. 6 shows a schematic representation of the flexible strips that protect the elongation sensor.

FIG. 6 shows a three-dimensional representation of the principle of protection of the elongation sensor 101 with flexible strips 401. A flexible strip is arranged on the flexible support to form a tunnel in which the elongation sensor can freely glide. Only the edges of the flexible strips are bonded to the flexible support 302 such that the elongation sensor can be freely slide in the elastic sheath. The sheath is bonded to the garment by use of a hot-meld adhesive method where the flexible strip is heated to a temperature of approximately 130° C. The flexible strip comprises an elastic core, a thermo-adhesive layer on both sides of the core and a protective paper which is removed when the flexible strip is bonded to the flexible support. Topstitches 402 might be used to secure the attachment of a flexible strip to the flexible support but they are not essential to the Invention.

Figure 7:
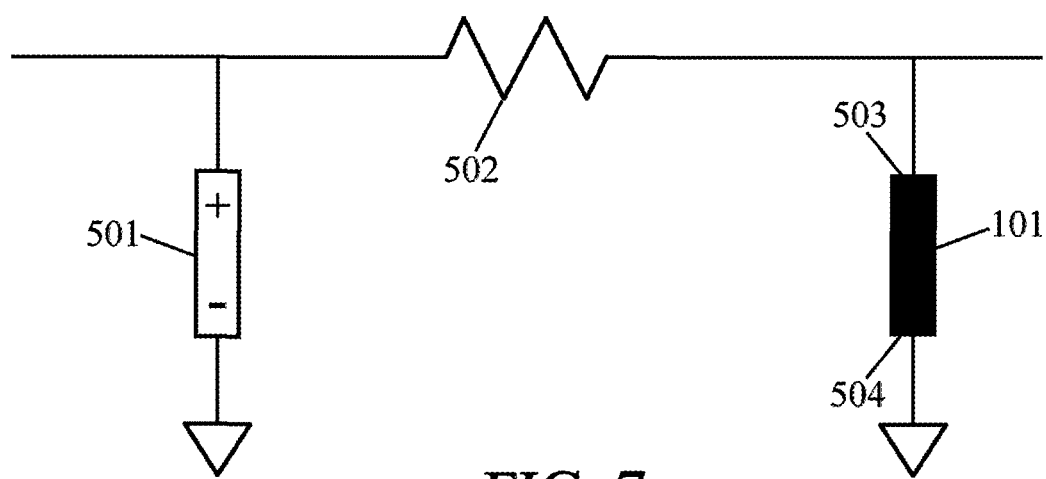
FIG. 7 shows an electrical diagram of the elongation sensor and a device to measure the resistance of the resistive elements.

FIG. 7 shows an electrical diagram of the elongation sensor 101 and a device to measure its resistance. The apparatus comprises a voltage generator 501, which can be a battery, and a first resistance 502. The voltage generator 501 generates a weak input voltage U1, of the order of few millivolts. The output voltage U2 generated at the terminals of the elongation sensor is equal to:

$$U2=U1*R/(R+R502)$$

where R is the resistance of the elongation sensor, R502 is the value of the resistance 502. By measuring the voltage between the ends 503 and 504 of the elongation sensor, it is possible to deduce its resistance R.

It will be appreciated that the embodiments described above are illustrative of the invention disclosed herein and that various modifications can be made without departing from the scope as defined in the appended claims.

The invention claimed is:

1. A wearable article, comprising:
   a flexible support;
   at least one elongation sensor, arranged on the flexible support so as to have a length varying when a wearer of the wearable article breathes or when muscles of the wearer are contracted or relaxed; and
   at least one flexible strip arranged on the flexible support, wherein the elongation sensor comprises:
   an elastic, electrically insulating core; and
   at least two resistive elements arranged helically around the elastic core, wherein two of the resistive elements are helically arranged in opposite directions and in contact with each other,
   wherein the at least one flexible strip forms a sheath and wherein the elongation sensor is disposed in the sheath.

2. The wearable article of claim 1, wherein each of the resistive elements of the at least one elongation sensor comprises metal-plated polyamide-based material.

3. The wearable article of claim 1, wherein the resistive elements of the at least one elongation sensor in contact with each other have a resistance smaller than 200 Ω/m.

4. The wearable article of claim 1, wherein the core of the at least one elongation sensor is made of an elastane material.

5. The wearable article of claim 1, wherein the resistive elements of the at least one elongation sensor are arranged helically around the core with a pitch in a range from 0.9 mm to 1.8 mm.

6. The wearable article of claim 1, wherein each of the two resistive elements of the at least one elongation sensor has two ends attached to the flexible support.

7. The wearable article of claim 6, wherein the ends of the resistive elements are attached to the flexible support by stitching.

8. The wearable article of claim 7, further comprising a pair of conductive yarns respectively connected to the ends of the resistive elements by stitching.

9. The wearable article of claim 8, wherein the conductive yarns are sewn on the flexible support.

10. The wearable article of claim 1, wherein the elongation sensor is configured to be pre-stressed when the wearable article is worn by the wearer.

11. The wearable article of claim 1, in the form of a garment, wherein the at least one elongation sensor comprises an elongation sensor disposed to be located around a chest of the wearer.

12. The wearable article of claim 1, in the form of a garment, wherein the at least one elongation sensor comprises an elongation sensor disposed to be located around an abdomen of the wearer.

13. A method for detecting breathing of a subject comprising:
   the subject wearing a wearable article comprising an elongation sensor according to claim 1;
   applying a voltage to the elongation sensor;
   determining a resistance based on the applied voltage; and
   determining a breathing parameter of the subject based on the resistance.

* * * * *